United States Patent
Schanlaub et al.

(10) Patent No.: US 11,150,218 B2
(45) Date of Patent: Oct. 19, 2021

(54) PARALLEL TUBE INSPECTION SYSTEM

(71) Applicant: Amerapex NDT LLC, Houston, TX (US)

(72) Inventors: Kenny Schanlaub, Manvel, TX (US); Steven Christopher, Manvel, TX (US); William Parker, Manvel, TX (US); Remy Kalai, Houston, TX (US)

(73) Assignee: Amerapex NDT LLC, Houston, TX (US)

( * ) Notice: Subject to any disclaimer, the term of this patent is extended or adjusted under 35 U.S.C. 154(b) by 49 days.

(21) Appl. No.: 16/426,616

(22) Filed: May 30, 2019

(65) Prior Publication Data

US 2019/0369054 A1 Dec. 5, 2019

Related U.S. Application Data (60) Provisional application No. 62/678,034, filed on May 30, 2018.

(51) Int. Cl.
*G01N 27/904* (2021.01)
*G01N 27/90* (2021.01)

(52) U.S. Cl.
CPC ....... *G01N 27/904* (2013.01); *G01N 27/9006* (2013.01)

(58) Field of Classification Search
CPC ........ G01N 27/83; G01N 27/87; G01N 27/89; G01N 27/9006; G01N 27/9013; G01N 27/904; G01N 27/9033; G01N 27/902; G01N 21/954; G01N 21/8851; G21C 17/017; G02B 23/24; F22B 37/003; G06T 7/0008
See application file for complete search history.

(56) References Cited

U.S. PATENT DOCUMENTS

| | | | |
|---|---|---|---|
| 5,039,226 A | 8/1991 | Lavoie | |
| 5,105,876 A | 4/1992 | Burack et al. | |
| 5,140,265 A * | 8/1992 | Sakiyama | G01N 27/902 324/220 |
| 5,341,406 A | 8/1994 | Jens et al. | |
| 5,555,851 A | 9/1996 | Vandenberg | |
| 6,681,839 B1 | 1/2004 | Balzer | |
| 8,524,011 B2 | 9/2013 | Gardner et al. | |
| 10,168,527 B2 | 1/2019 | Tripathy | |
| 10,557,824 B1 * | 2/2020 | Olsson | G01N 27/82 |
| 2003/0121340 A1 * | 7/2003 | Hawkins | F22B 37/486 73/866.5 |
| 2006/0191119 A1 * | 8/2006 | Coleman | F22B 37/00 29/402.01 |
| 2011/0125462 A1 * | 5/2011 | Petrosky | G01N 27/902 702/188 |

(Continued)

*Primary Examiner* — David M Schindler
(74) *Attorney, Agent, or Firm* — Norton Rose Fulbright US LLP (57) ABSTRACT

A system, apparatus, and method of quickly inspecting tubes of chemical plants is provided, where one or more tube inspection apparatuses are used to simultaneously perform electromagnetic testing ("ET") of multiple tubes of a chemical plant by simultaneously lowering probes into separate tubes and transmitting the data to a processor. In some embodiments, the data from the probes can be transmitted in real or near-real time to a remote processor for analysis to determine whether any defects exist in the tubes and the extent of such defects.

13 Claims, 11 Drawing Sheets

(56) References Cited

U.S. PATENT DOCUMENTS

2012/0193065 A1\* 8/2012 Kawase ............... G01N 27/902
                                                                        165/11.1
2016/0025961 A1     1/2016 Tripathy \* cited by examiner

PARALLEL TUBE INSPECTION SYSTEM

CROSS-REFERENCE TO RELATED PATENT APPLICATIONS

This application claims the benefit of priority to U.S. Provisional Patent Application No. 62/678,034 to Tripathy et al. filed on May 30, 2018, and entitled "Non-Destructive Inspection Technology," which is hereby incorporated by reference.

FIELD OF THE DISCLOSURE

The present invention relates generally to tube inspection and more specifically, but not by way of limitation, to use of a tube inspection system, apparatus, and method to inspect multiple tubes simultaneously, and in some embodiments to analyze the inspection data very quickly.

BACKGROUND

Chemical processing plants, such as petrochemical plants, seek to optimize produced product quality, plant safety, and cost efficiency, among other things, by using advanced process control equipment. One variable in process control that is difficult to control is the corrosion rate and resultant failure of tubing within the plant, including within reactors, boilers, exchangers, and other pressure vessels. Such failure can have catastrophic consequences, including environmental costs from waste that may be produced into the environment as result of the failure, economic costs from having to shut down and inspect the plant as well as pay environmental penalties, and safety and health costs, including impacts on the health of workers and those that live near the plant that may be affected by any chemicals discharged into the environment as a result of a failure.

Despite these serious risks, many chemical processing plant operators/owners have neglected this variable because of the large costs associated with addressing it. For example, addressing the corrosion rate of tubing generally involves regular inspection of such tubing and such inspection typically requires shutting down the plant or portions of the plant for extended periods of time to inspect each of the tubes that process chemicals. This is an expensive, time-consuming, and difficult task.

SUMMARY

Embodiments of the present invention help solve these problems by providing high-speed systems and methods of inspecting the tubes of chemical plants using one or more tube inspection apparatuses to simultaneously perform electromagnetic testing ("ET") of multiple tubes of a chemical plant. Such ET can be used in conjunction with other tubular testing methods such as Penetrant Testing ("PT") and/or Ultrasonic Testing ("UT"). In some embodiments, the data from the ET can be transmitted in real or near-real time to a remote processor for analysis to determine whether any defects exist in the tubes and the extent of such defects. In some embodiments, a method can be performed that involves individually controlling a plurality of probes through a plurality of pipes/tubes to perform individual inspection of the pipes/tubes with the plurality of probes by simultaneously collecting ET and/or video data from the plurality of probes, where the probes are all controlled by a shared motor.

Advantages of such embodiments include, among others: (1) reduced tube inspection time, (2) reduced non-operational plant time, (3) more comprehensive tube inspection, (4) faster analysis of inspection data, (5) faster remediation of discovered defects and/or removal of defective tubing, (6) incentives for greater compliance with environmental and other governmental regulations; (7) better prediction of remaining tubular life, (8) an increase in production runs, (9) greater avoidance of tubular failures, and (10) increased productivity of the plant over its life.

In some embodiments of the present invention, a tube inspection system is provided having one or more tube inspection apparatuses positioned vertically above a series of tubes within a chemical vessel, such as a reactor or exchanger. The tube inspection apparatuses may have a moveable base that includes a bottom assembly, a guide assembly, and a rotatable drum. The base may be positioned within the vessel through a manway in the side of a vessel. To facilitate such transfer through the manway, the tube inspection apparatus may be configured to be easily disassembled into components, the components passed individually (or not all at the same time) through the manway, and then the components reassembled inside the vessel. The drum of the tube inspection assembly may include more than one removable reel that can be interlocked and simultaneously rotated when the drum is rotated by a motor coupled thereto (and, e.g., operable by an operator in the vessel). In some embodiments, each reel is coupled to a line (e.g., a cable) at one end of the line and the line is wound up onto the reel and down from the reel as the reel is rotated by the motor. In some embodiments a probe is attached to the other end of the line such that winding up and down the line raises and lowers the probe, for example, within a tube. In some embodiments, the reels are rotated simultaneously in such a configuration to simultaneously raise and lower each probe coupled thereto vertically into and out of a different tube within the vessel. In some embodiments, the motor is an electric motor with a chain drive that can provide sufficient power to rotate the drum without slipping when raising and/or lowering more than one probe; for example, up to 16 probes, at once. The probes may perform ET while be lowered and/or raised and the data from such ET may transmitted through the line to a tester coupled to the tube inspection apparatus.

In some embodiments, the data from such a transmission is further transmitted to a remote processor located outside the vessel and/or laptop located within the vessel, for example, in real or near-real time. In some embodiments, the data is transmitted to the remote processor using a series of bridges. In some embodiments the bridges include an omnidirectional mast mounted inside the vessel that receives the data from the laptop and/or tube inspection apparatus, a directional parabolic antenna mounted outside the vessel and closer to the vessel than the processor that receives the data from the omni-directional mast within the vessel, and another omni-directional mast mounted outside the vessel and closer to the processor than the vessel that receives the data from the directional parabolic antenna and communicates the data to the processor.

In some embodiments, the tubes that will be inspected are first prepared and the vessel ventilated prior to any inspection. In some embodiments, the analysis of the data includes phase and/or voltage analysis and/or is used to determine whether any defects exist in any of the tubes and the extent of such defects. Such analysis may also be used to predict future failures and determine whether remediation or removal of the tubes from operation is needed or desired. After such analysis, the data may be uploaded in reporting software.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, where the percentage includes 0.1, 1, 5, and 10 percent.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
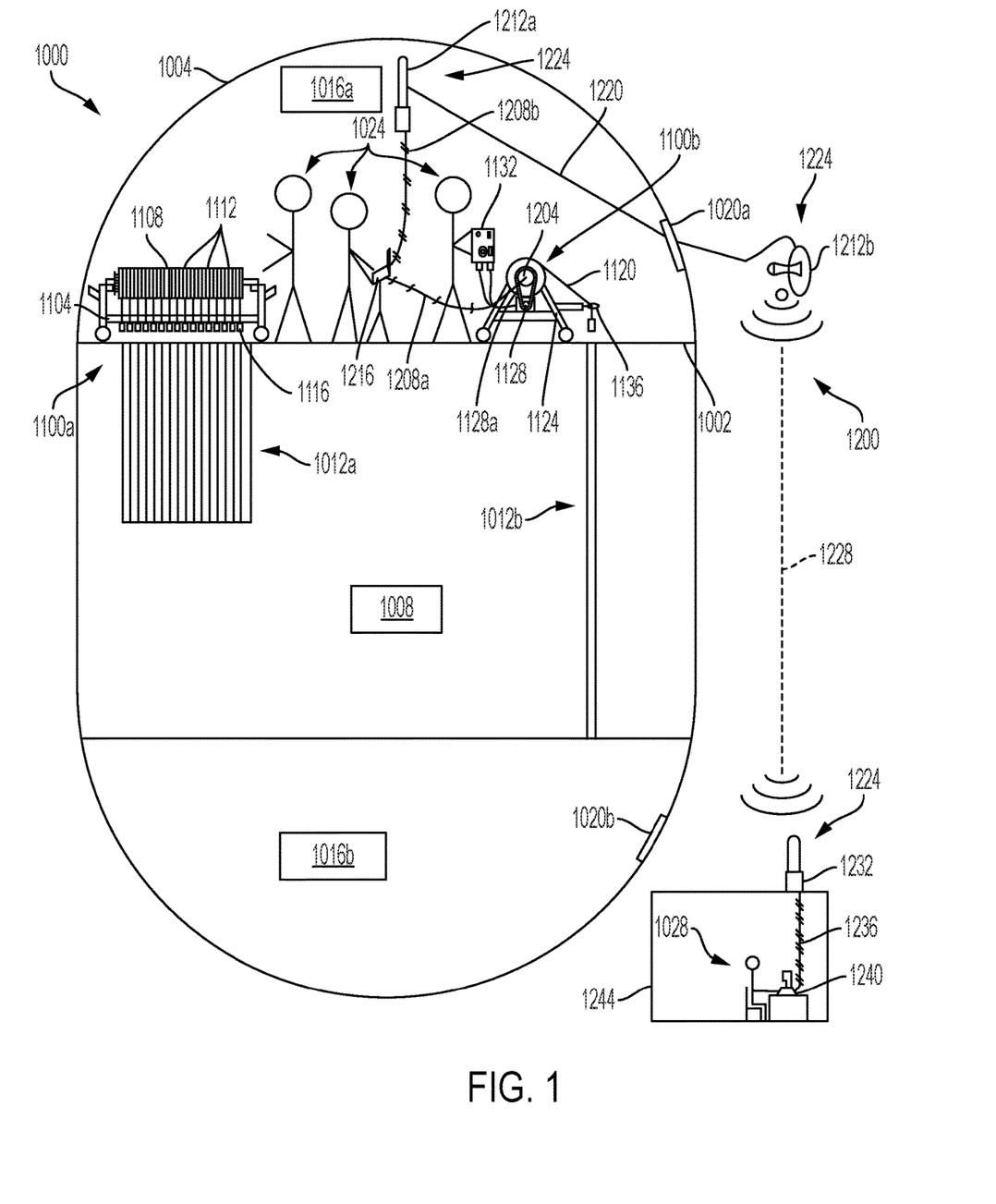
FIG. 1 depicts a schematic view of a system for inspecting tubes using a tube inspection apparatus according to some embodiments of the present systems, apparatuses, and methods.

Referring to the drawings, FIG. 1 depicts a system for inspecting tubes 1000 using tube inspection apparatuses. As shown, two tube inspection apparatuses 1100a, 1100b are positioned on a floor 1002 and within an upper chamber 1016a of a vessel 1004. Vessel 1004 can be an exchanger, a reactor, or the like and include groups of vertically-oriented tubes referred to as "tubular bundles" arranged in tubular sheets 1012a, 1012b in a central portion 1008 of vessel 1004. The tubes of the tubular bundles can be different lengths and may be between 20 and 40 feet in length or longer. Tubular bundles can each contain thousands of tubes but for ease of depiction, only a few tubes of such tubular bundles are shown in FIG. 1. As shown in FIG. 1, tubular sheet 1012a is only about half the length of central portion 1008, while tubular sheet 1012b extends the full length of central portion 1008. The tubes of tubular sheet 1012a are oriented transversely across the page in FIG. 1 and the tubes of tubular sheet 1012b are oriented transversely into the page in FIG. 1. Tube inspection apparatuses 1100a, 1100b are positioned vertically above tubular sheets 1012a, 1012b, respectively, and correspondingly oriented. Tube inspection apparatuses 1100a, 1100b may be movable along floor 1002 within upper chamber 1016a and repositioned to inspect additional and other tubes of the tubular bundle(s) of vessel 1004. For example, after inspecting tubular sheet 1012b, tube inspection apparatus 1100b may be moved transversely in a direction into or out of the page or transversely in a direction across the page to inspect another tubular sheet (not shown) in central chamber 1008. Because tube inspection apparatuses 1100a, 1100b can inspect multiple tubes at a the same time (e.g., all of tubular sheets 1012a, 1012b, respectively), as explained below, the process of inspecting many or all of the tubes of one or more tubular bundles in a vessel, such as vessel 1004, can be accomplished must faster than if such tubes were inspected one at a time.

Tube inspection apparatuses 1100a, 1100b are identical and each include the following components: a base 1104 having a removable bottom assembly 1124, a removable drum 1108, and a partially removable guide assembly 1136. Tube inspection apparatuses 1100a, 1100b can be transported into upper chamber 1016a through manway 1020a by, for example, operators 1024, e.g., technicians, data managers (3 shown; one technician to operate each tube inspection apparatus and one data manager to operate laptop 1216). If manway 1020a is too small for tube inspection apparatuses 1100a, 1100b to pass through it, tube inspection apparatuses 1100a, 1100b can be transported through manway 1020a in separate components (e.g., base 1104, bottom assembly 1124, drum 1108, parts of guide assembly 1136) and then assembled, for example by operators 1024, once inside upper chamber 1016a. Other components of tube inspection system 1000, such as bridge 1212 and laptop 1216, may similarly be transported into upper chamber 1016a through manway 1020a.

Removable drum 1108 has multiple removable interlocking reels 1112. Each reel 1112 can be removably or non-removably coupled to one end of a line (e.g., a poly or "cat 5" cable) 1120. The other end of each line 1120 can be removably coupled to a probe 1116 (sixteen shown). A motor 1128 that is coupled to base 1104 can rotate drum 1108, including interlocking reels 1112, to simultaneously wind in and out lines 1120 onto and from the reels 1112 and thereby raise and lower probes 1116. When positioned over tubular sheets 1012a, 1012b, probes 1116 can each be lowered simultaneously into and out of the tubes, including along the entire length of the tubes. Guide assembly 1136 can be positioned on base 1104 to guide probes 1136 via lines 1120 into and out of the tubes. Exemplary embodiments of base 1104 and drum 1108 are discussed in more detail with reference to FIGS. 2A-2C and 3A-3F, respectively.

Motor 1128 of tube inspection apparatuses 1100a, 1100b can be a variable speed electric servo motor that is compatible with a control system/box 1132 that can operate the motor to automate the descent and ascent of the probes. For example, probes 1116 can each include a sensor that can determine when the probe 1116 is close to one end or both ends of a tube (e.g., by using visual signals or detection of the end of tube "air") and communicate that information to the control system/box 1132, which can then stop, including automatically, the motor 1128 and/or reels 1112, and thereby stop the ascent and/or descent of the probe 1116 based on that signal. The control system/box 1132 can further be programmed to automatically retract the reels 1112 (e.g., by reversing the direction of operation of motor 1128) upon receiving an end-of-the-tube signal. Data from each probe 1116 can or can continue to be recorded while each probe is retracted. Motor 1128 can have a chain drive 1128a to provide more power than a friction drive for simultaneously raising and lowering the probes 1116. The chain drive can include a chain and one or more gears and provide sufficient power to rotate the drum without slipping when raising and/or lowering more than one probe; for example, up to 16 probes at once.

Probes 1116 can be individually calibrated utilizing, for example, ASME calibration standards and perform an Electromagnetic Test ("ET") while inside the tubes of tubular sheets 1012a, 1012b to inspect the tubes for defects, such as pitting, corrosion, wall loss, wastage, cracking, through wall holes, and the like, in either or both of the inner and outer cylindrical surfaces of the tube by, for example, measuring parameters of the tube with electromagnetic waves. ET can include any of the following methods: Remote Field ("RF"), Eddy Current ("EC"), Partial Saturation Eddy Current ("PSEC"), Full Saturation Eddy Current ("FSEC"), and Near Field ("NF"). Each probe 1116 can include a probe body (e.g., coupled to one end of a line 1120) and detachable probe head. Each probe head can be configured to perform one or more ETs, such as RF, EC, PSEC, FSEC, and/or NF. One or more probes 1116 can also each include a camera, for example on its probe head, for visual inspection of the tubes. A multi-electromagnetic adapter on the probes 1116 can be used to differentiate (e.g., via a custom 31-pin adapter) between the data received from different ET probe heads and, if included, video data from the camera. Such adaptor can be positioned to form a connection between the probe head and probe body. The ET and video data (collectively, "data") from each probe 1116 can be transmitted through network 1200 to a processor 1240, such as a computers, for storage and analysis. Network 1200 includes an inspection reel 1204, vessel bridge(s) 1224, and trailer 1244.

In operation, the data from each probe 1116 can be transmitted to inspection reel 1204 through line 1120 and, if desired, (e.g., through a LAN and/or bridge coupled to the inspection reel 1204) stored in a testing box and/or DVR coupled to inspection reel 1204. The data can then be transmitted from inspection reel 1204 directly to a bridge 1212a through a wired or wireless connection and/or through a wired or wireless connection 1208a to a laptop 1216 (or another processor) within upper chamber 1016a and operational by an operator 1024. If transferred to laptop 1216, the data can be monitored by operator 1024 and then either automatically or manually transmitted from laptop 1216 through wired or wireless connection 1208b from the laptop 1216 (or from inspection reel 1204 upon a command from laptop 1216) to vessel bridge(s) 1224. For example, the data may first be transmitted to bridge 1212a within upper chamber 1016a. Bridge 1212a can be an omni-directional mast that extends the network connection to the inspection reel 1204 and laptop 1216 and, together with bridge 1212b and bridge 1232, extends the network to a processor 1240 located in a trailer 1244 (or other location, such as a building or the like) outside of vessel 1004 (e.g., a thousand feet or more away from vessel 1004). For example, bridge 1212a can transmit the data received from laptop 1216 through wireless connection 1220 to a bridge 1212b located outside of vessel 1004 (e.g. externally mounted to vessel 1004). Bridge 1212b can be a directional parabolic antenna that receives the data from bridge 1212a and directs and/or transmits it through wireless connection 1228 to bridge 1232. Bridge 1232 can be an omnidirectional mast located outside of trailer 1244 (e.g., externally mounted to trailer 1244). Bridge 1232 can transmit the data through a wired or wireless connection 1236 to a processor 1240 accessible by an analyst 1028 (e.g., a certified Eddy Current Analyst) in trailer 1244. Network 1200 permits wireless transmission of the inspection data up to 1,000 feet or more from, for example, the top of upper chamber 1016a, which allows the data to be delivered to processor 1240 and analyst 1028 for real or near-real time storage and analysis of the data, rather than requiring analyst 1028 (or another person) to physically travel to or into chamber 1016a and download the data from laptop 1216 and/or inspection reel 1204. Such real or near-real time analysis also allows permits improved data quality control as issues with the data can be identified and resolved before the end of an inspection operation.

Each tube inspection apparatus 1100a, 1100b may be configured to simultaneously inspect any number of tubes by varying the number of reels and probes coupled to its base 1104. For example, a tube inspection apparatus may include between 2 and 16 reels, between 2 and 8 reels, between 8 and 16 reels, or any other number of reels, as may be required or desired for an inspection operation.

Figure 2A:
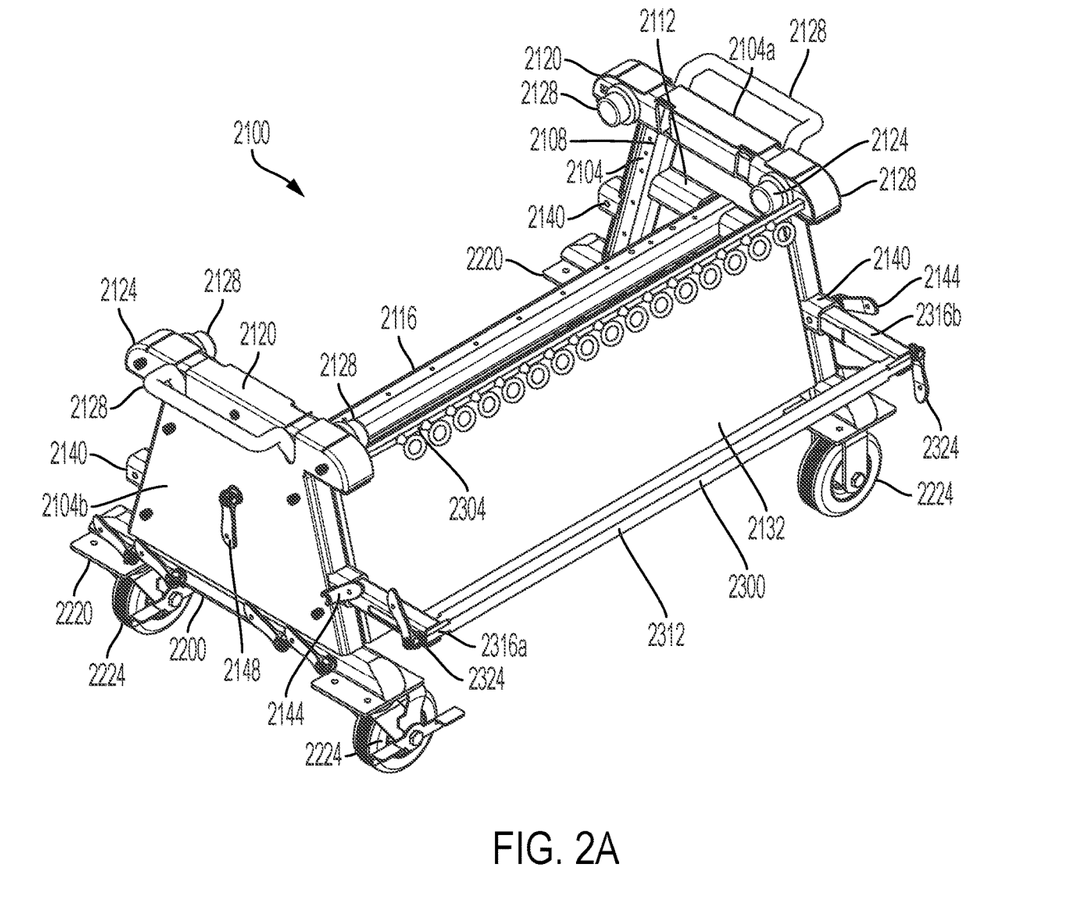
FIGS. 2A-2C depict a perspective view, side view, and end view, respectfully, of a base of a tube inspection apparatus according to some embodiments of the present systems, apparatuses, and methods.
Figure 2B:
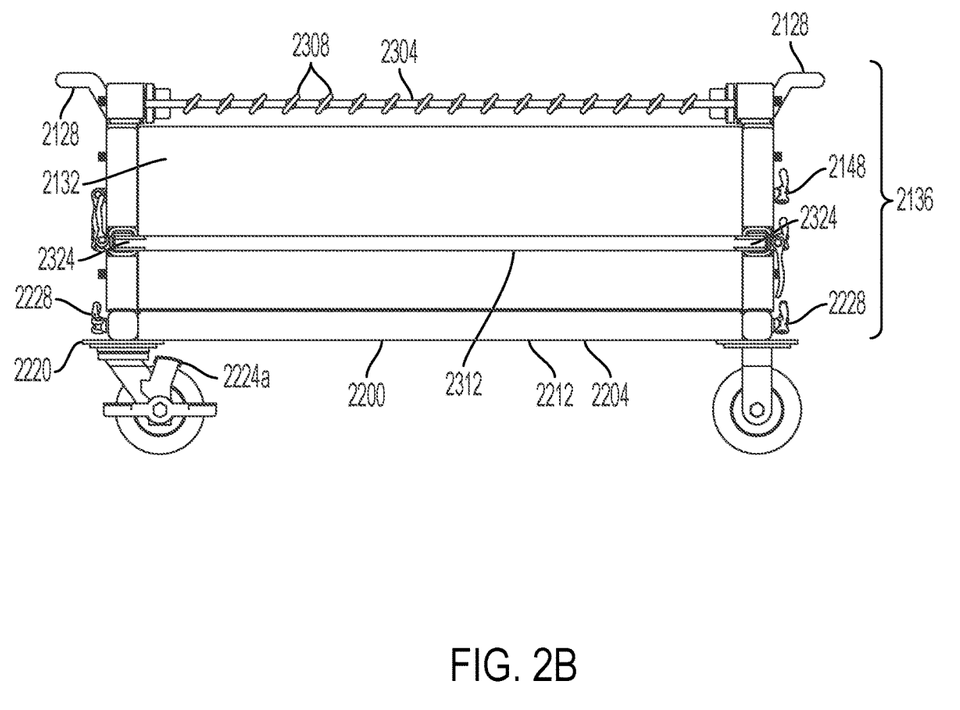
Figure 2C:
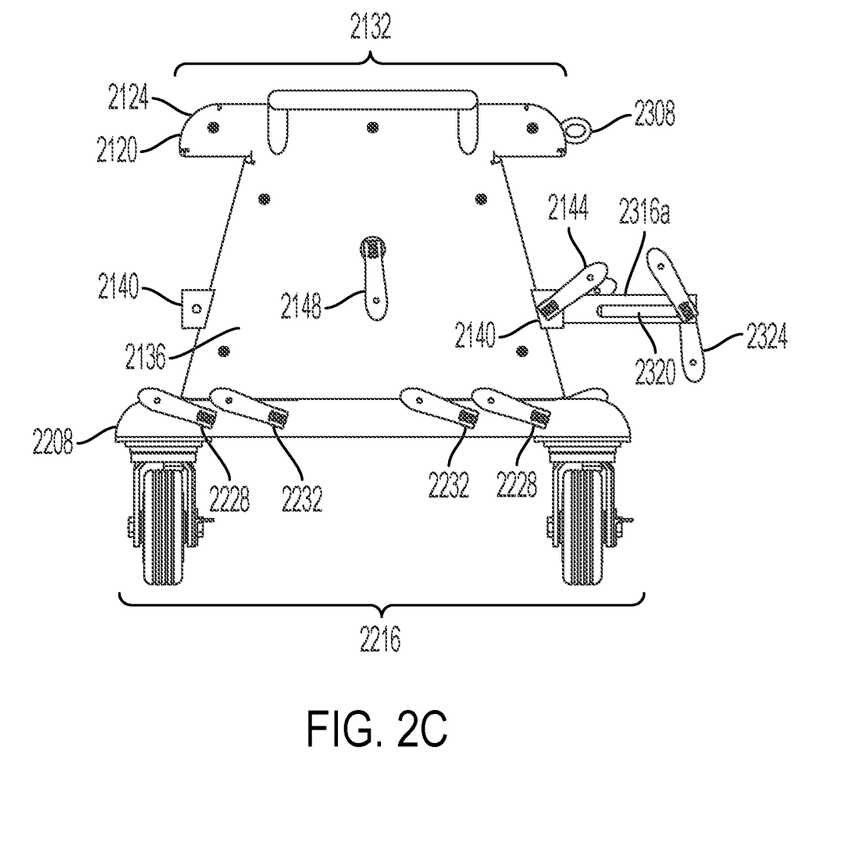

Referring now to FIGS. 2A-2C, an exemplary base 2100 of some embodiments of the tube inspection apparatus is shown. Base 2100 includes a frame 2104, a bottom assembly 2200 and a guide assembly 2300. Each structural component of base 2100, including each structural component of frame 2104, bottom assembly 2200, and guide assembly 23000, may be made from a sufficiently strong material such as steel.

Frame 2104 has a pair of inwardly-angled, vertically-extending A-frame bars 2108 at each of its ends 2104a, 2104b that are coupled along their lengths to cross-bars 2112 and that, together with cross-bars 2112, support a central support bar 2116 that extends substantially centrally between the ends 2104a, 2104b. Frame 2104 further includes a side panel 2132 that extends between and is coupled to one A-frame bar 2108 positioned on end 2104a and one corresponding A-frame bar 2108 positioned on end 2014b. Side panel 2132 separates central support bar 2116 from any probes, such as probes 1116 described with reference to FIG. 1, coupled to base 2100, for example by a line coupled at one end to a reel of a drum supported by frame 2104. Frame 2104 further includes a top end frame member 2120 coupled to the top of each pair of A-frame bars 2108 at each end 2104a, 2104b. Top end frame members 2120 each include a pair of protrusions 2124 extending transversely in the planar direction of ends 2104a, 2104b, and a handle 2128 extending transversely perpendicular to the planar direction of ends 2104a, 2104b. Handles 2128 may be utilized by an operator to move base 2100 (and any drum, lines, probes, and other components it is supporting) on a surface such as a floor, for example, on wheels of wheel assemblies 2224 of bottom assembly 2200. The interior surfaces of each of protrusions 2124 include a ball-bearing roller 2128, which together support a drum and allow it rotate freely thereon. Frame 2104 further includes a connection 2140 coupled to each A-frame bar 2108 partway down the length of and extending transversely outwardly in the planar direction of ends 2104a, 2104b of A-frame bars 2108. Each connection 2140 can receive and couple to the end of a connection bar of a guide assembly such as connection bars 2316a, 2316b of guide assembly 2300, as explained below. Frame 2104 has a maximum width 2132 and a maximum height 2136. Width 2132 and height 2136 can be selected such that frame 2104 can fit through a manway access door of a vessel, such as manway access door 1020a of vessel 1004 described with reference to FIG. 1. Frame 2104 is self-supporting but can also be supported on bottom assembly 2200.

Bottom assembly 2200 includes a frame 2204 having two end bars 2208, each end bar 2208 positioned beneath and removably coupled to a different end 2104a, 2104b of frame 2104 and in oriented in the same planar direction as ends 2104a, 2104b. Frame 2204 further includes two side bars 2212 that are substantially the same length as central support bar 2116. Each side bar 2212 is removably coupled to each end bar 2208 along the length of each end bar 2208 and is oriented substantially parallel to central support bar 2116 between ends 2104a, 2014b. Each end bar 2208 has a length 2216 that is sufficiently long to distribute the weight of frame 2104, guide assembly 2300 and any drum, probes, lines, and other components supported by base 2100, such that during operation of the tube inspection apparatus, base 2100 does not become unstable and/or tip over. A flange plate 2220 is coupled to the bottom of each end of end bars 2208. The bottom of each flange plate 2220 is coupled to a wheel assembly 2224. Wheel assemblies 2224 can each include a wheel and a swivel mechanism that allows the wheel to transversely rotate about a vertical axis to facilitate steering of base 2100 along a surface. Some of the wheel assemblies may further include a brake, such as brake 2224a, that, when locked, may substantially prevent transverse movement of base 2100 along a surface.

Guide assembly 2300 includes an upper guide bar 2304 extending between ends 2104a, 2104b and removably coupled at each its ends to the interior surfaces of a protrusion 2124 of each of the top end frame members 2120. Upper guide bar 2304 includes multiple guide rings 2308 arranged along its length, which can receive and constrain the lateral movement of a line, such as line 1120 described with reference to FIG. 1, and a probe attached to the line, such as probe 1116, also described with reference to FIG. 1. Guide rings 2308 can be movable along the length of upper guide bar 2304 by, for example, a pin and slot connection, and can be secured in different transverse locations therealong, e.g., via a fastener. Guide assembly 2300 further includes a lower guide bar 2312 positioned on the same side of base 2100 as upper guide bar 2304 and that is substantially the same length as upper guide bar 2304. Each end of lower guide bar 2312 is coupled a connection bar 2316a, 2316b, respectfully, by a pin and slot connection. For example, the ends of lower guide bars 2312 can each have a protruding pin that extends through the slot 2320 of each of connection bars 2316a, 2316b. The other end of each of connection bars 2316a, 2316b are received within and removably secured to connections 2140 of frame 2104.

Such a connection allows lower guide bar 2312 to move in one transverse direction within slots 2320 to thereby adjust the lateral distance of a line (and the probe attached to the line) when such line is coupled to a drum coupled to base 2100 and contacts lower guide bar 2312. For example, a line may be coupled at one end to a reel of a drum supported by frame 2104, and the line may extend through a guide ring 2308 and against the outer exterior surface of lower guide bar 2312 such that the line (and any probe connected to the other end of the line) may be maintained a lateral distance away from base 2100 and, for example, vertically above a tube. As shown in FIG. 2C, such lateral distance may extend beyond the width 2216 of bottom assembly 2200 such that bottom assembly 2200 (including wheel assemblies 2224) need not be positioned over any tubes to be inspected, which might otherwise interfere with such inspection operation and/or damage the tubes. In order to secure the transverse location of lower guide bar 2312 within slots 2320, couplers 2324 are provided on each outer end of the pins of lower guide bar 2312, which can be operated to secure lower guide bar 2312 within a transverse location of slots 2320. Couplers 2324 can operate by friction, a threaded connection, or otherwise to prevent relative movement between lower guide bar 2312 and connection bars 2316a, 2316b when in a secured positioned. For example, movement of handle 2324a toward lower guide bar 2312 may force a component, such as seal, of coupler 2324 into compression against an exterior surface of a connection bar 2316a, 2316b to thereby secure lower guide bar 2312 to such connection bar by friction.

Because connection bars 2316a, 2316b of guide assembly 2300 and end bars 2208 of bottom assembly 2200 may extend beyond width 2132 and therefore may extend beyond the largest dimension of a manway of a vessel (and thereby prevent base 2100 from being able to pass through such manway), and for other reasons that may be appreciated, additional couplers 2144 and 2228 (which can operate the same or similarly to couplers 2324) are provided that may be operated to coupler and decouple lower connection bars 2316a, 2316b (and lower guide bar 2312) and bottom assembly 2200, respectively from frame 2104, so that such components will not interfere with the passage of frame 2104 through the manway. Connection bars 2316a, 2316b (and lower guide bar 2312) and bottom assembly 2200 may separately be transported through the manway and reassembled (e.g., via couplers 2144 and 2228) with frame 2104 inside the vessel to form base 2100. For example, couplers 2144 may each be positioned on the exterior end surface of each of connections 2140 to couple and decouple connection bars 2316a, 2316b when positioned within connections 2140. Similarly, couplers 2228 may each be positioned on the exterior end surface of end bars 2208 to couple and decouple bottom assembly 2200 to frame 2104 (e.g., by receiving bottom ends of A-frame members 2108 within slots of end bars 2208).

Additional couplers 2232 (which can operate the same or similarly to couplers 2324) may be provided on the exterior end surface of end bars 2208 to couple and decouple side bars 2212 to end bars 2208 (e.g., by receiving ends of side bars 2212 in slots in the sides of end bars 2208) so that bottom assembly 2200 may also pass through a manway (and then be reassembled within the vessel, e.g., via couplers 2232). Finally, a coupler 2148 (which can operate the same or similarly to couplers 2324) may be positioned substantially centrally on each exterior end surface of end panels 2136 to couple and decouple central support bar 2116 within frame 2104 (e.g., by receiving ends of central support bar 2116 within slots in the sides of end panels 2136). Removing central support bar 2116 and bottom assembly 2200 from frame 2104 can allow each end frame assembly (e.g., the pair of A-frame bars 2108, cross bar 2112, and top end frame member 2120 of end 2104*a*) to be transported as separate and single unit, for example, through a manway of a vessel.

Turning to FIGS. 3A-3D, an exemplary drum 3000 of some embodiments of the tube inspection apparatus is shown. Drum 3000 includes a first end 3000*a* having a cylindrical first end cap 3004 and a second end 3000*b* having a second cylindrical end cap 3008. End cap 3004 includes a series of equally spaced holes 3028 (eight shown) spaced equidistant inside the outer cylindrical surface of end cap 3004 for receiving one or more rods 3092 (eight shown). End cap 3004 further includes a series of equally spaced holes 3076 (twenty-five shown) spaced equidistant inside the outer cylindrical surface of end cap 3004, but closer to the outer cylindrical surface of end cap 3004 than holes 3028, for receiving one or more protrusions 3020 of a reel 3012. End cap 3004 further includes a hatch 3048 substantially in the center of end cap 3004 that is mounted on hinges 3052 to end cap 3004 such that hatch 3048 can allow access to the interior of drum 3000 through end cap 3004. Hatch 3048 further includes a stop 3056 for, for example, preventing hatch 3048 from passing into the interior of drum 3000. Hatch 2048 further includes a lock 3060 that may be operated (e.g., by a flat head screwdriver) to secure hatch 3048 in a closed position or to allow hatch 3048 to be moved to an open position via hinges 3052. A slip ring (i.e., an electromechanical device that allows the transmission of power and electrical signals from a stationary structure to a rotating structure such as drum 3000) may be coupled to end cap 3004 to provide power to any electronics within drum 300 such that, for example, any electronic cables, wiring, of the like within drum 3000 do not become entangled or twisted during rotation of drum 3000.

End cap 3008 includes a circular flange gear 3036 that includes a series of teeth 3064 along its outer circular edge. Flange gear 3036 can be unitary with end cap 3008 or secured by fasteners (e.g., bolts) through holes 3068 and 3072 (see FIG. 3D). Flange 3036 extends far enough from end cap 3008 to allow a chain to be coupled to teeth 3064 without contacting end cap 3008. Such a chain may be coupled to a motor, such an electric motor, to power rotation of drum 3000 and each of its components. This chain may form part of a chain drive of the motor.

End caps 3004 and 3008 are secured to each other by rods 3092 (8 shown). Each rod 3092 has a stop 3088 at one end that is pressed against the interior surface of end cap 3008 when drum 3000 is assembled. The other end of each rod 3092 extends through holes 3028 in end cap 3004. One or more of these ends of rods 3092 can be secured to end cap 3004 by one or more fasteners 3044 (e.g., nuts that couple to threads on the ends of rods 3092) and washers 3040, though not all rods 3092 need to be so secured to secure end caps 3004 and 3008 together (only two shown secured in FIGS. 3A and 3C).

Positioned between end caps 3004 and 3008 are a series of interlocking reels 3012 (sixteen shown) that each include two rings 3016, 3032 and a series of (e.g., six) curved plates 3024 that space apart and couple rings 3016, 3032 together.

Figure 3A:
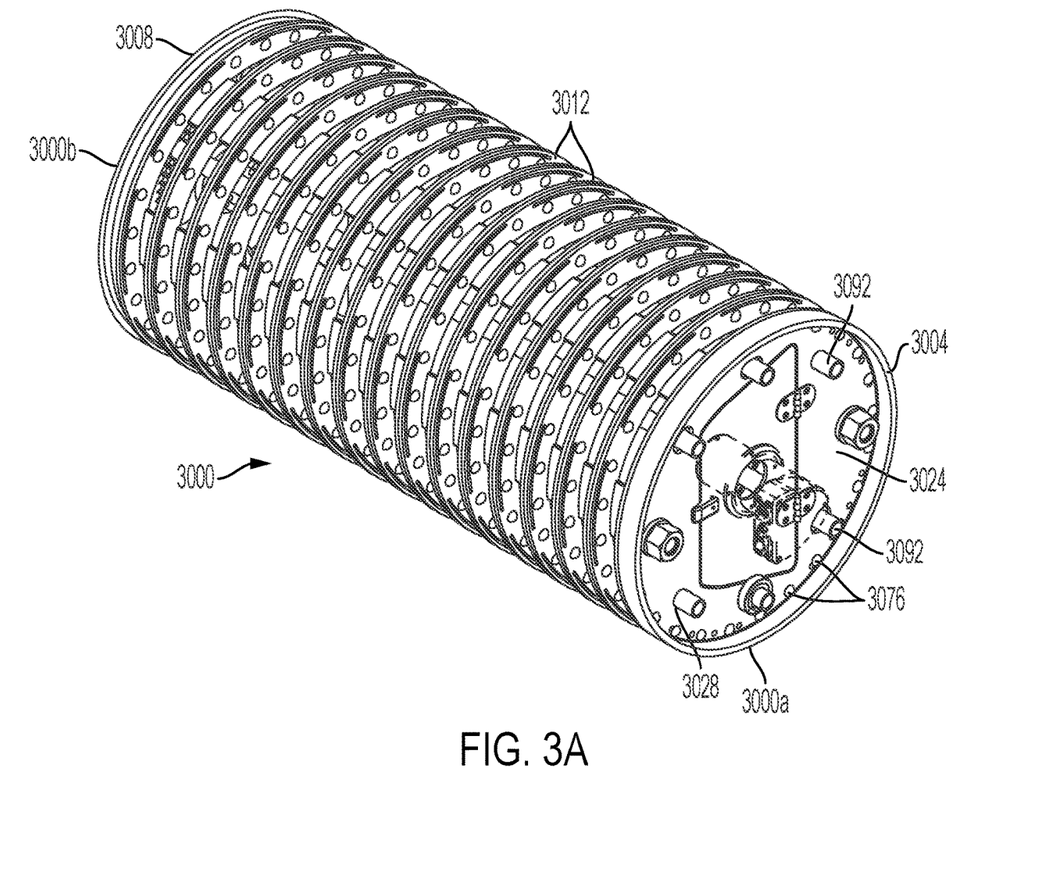
FIGS. 3A-3D depict a perspective view, side view, end view, and exploded perspective view of a drum of a tube inspection apparatus according to some embodiments of the present systems, apparatuses, and methods.
Figure 3B:
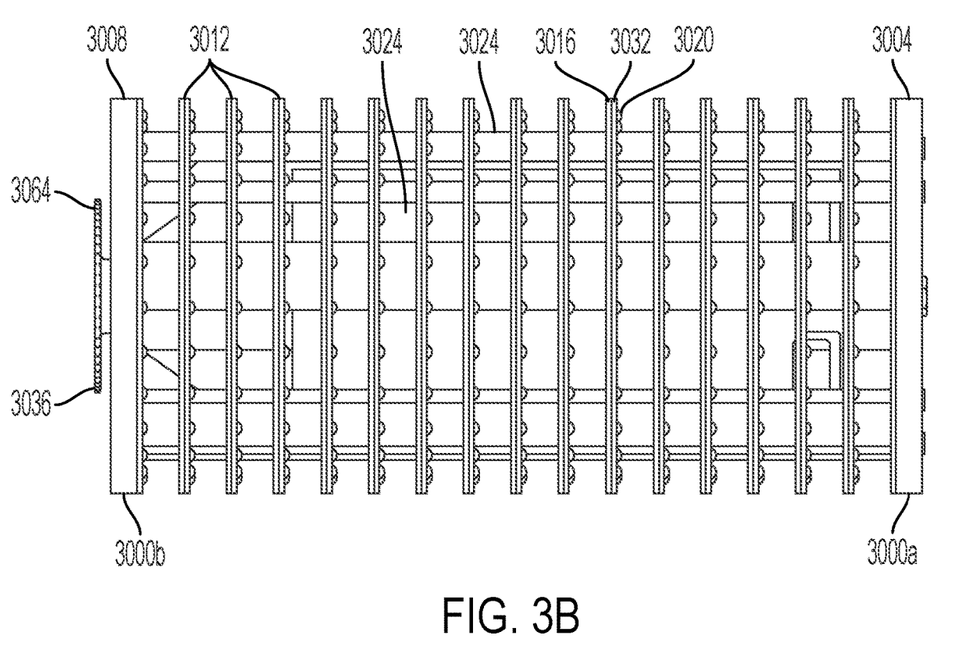
Figure 3C:
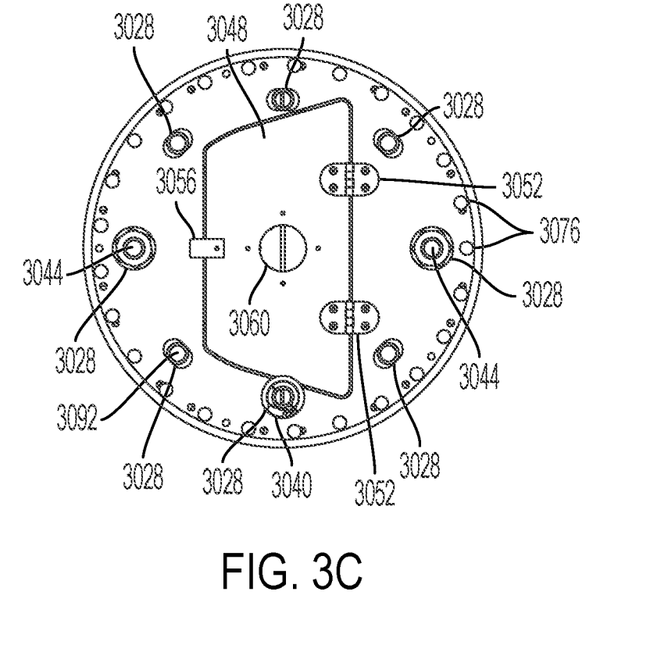
Figure 3D:
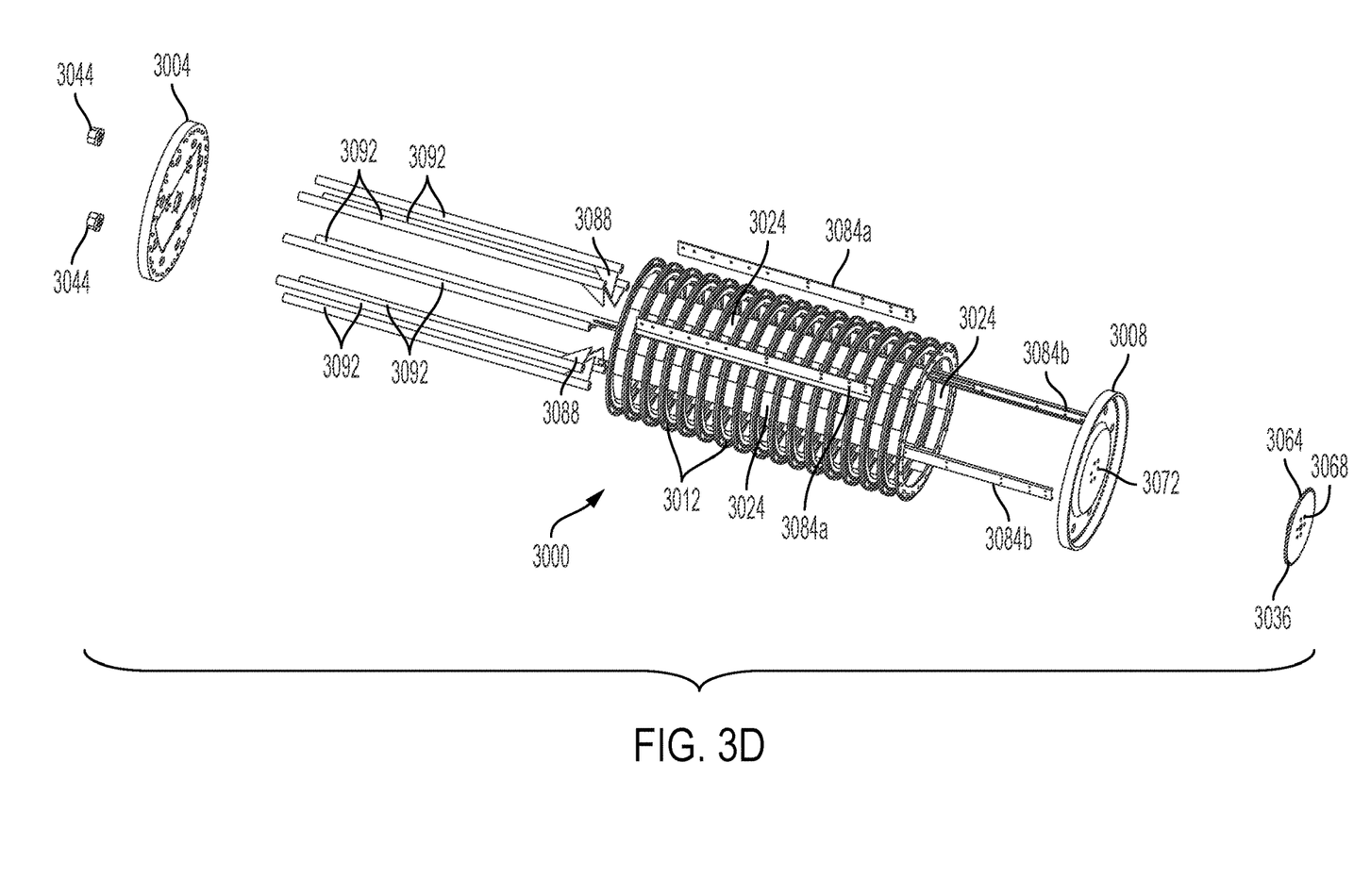
Figure 3E:
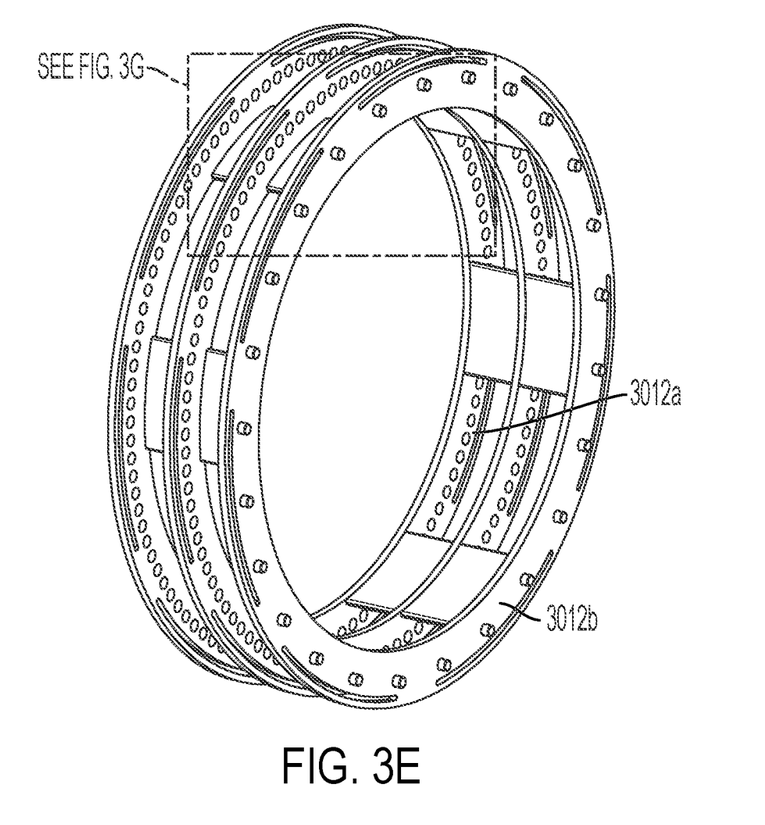
FIG. 3E depicts a perspective view of two interlocked reels of the drum of FIGS. 3A-3D according to some embodiments of the present systems, apparatuses, and methods.
Figure 3F:
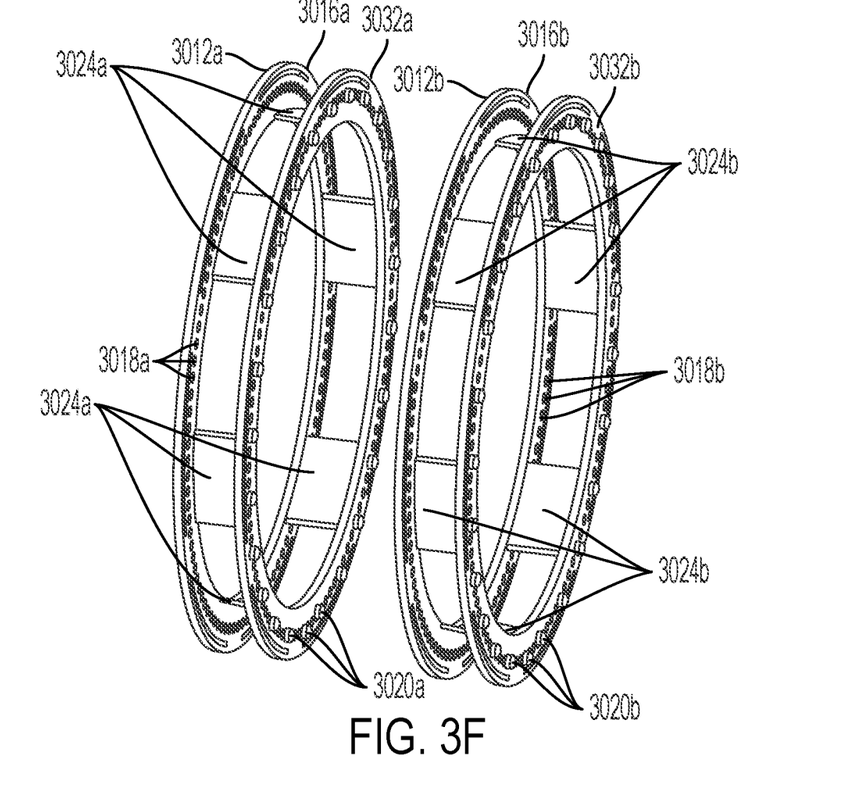
FIG. 3F depicts a perspective view of two interlocking reels of the drum of FIGS. 3A-3D according to some embodiments of the present systems, apparatuses, and methods.
Figure 3G:
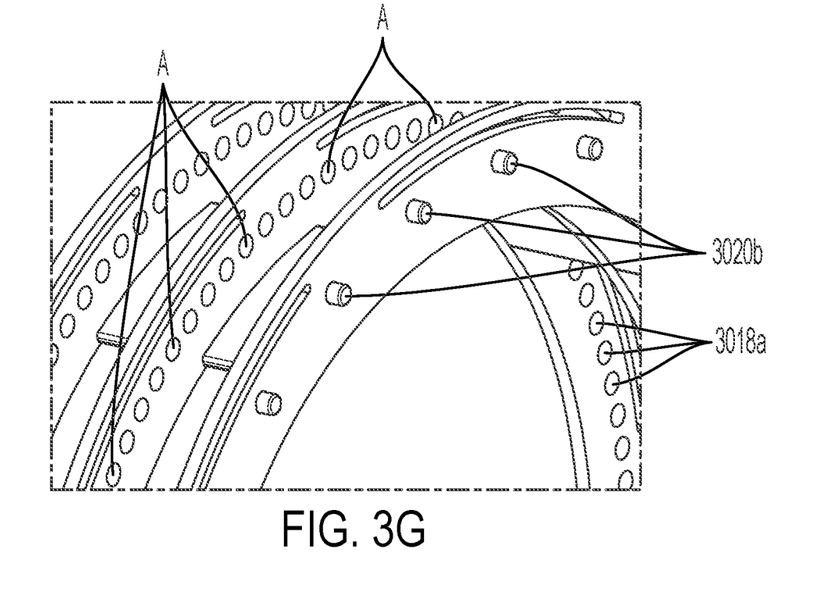
FIG. 3G depicts an enlarged view of a portion of FIG. 3E.

FIGS. 3E-3G depict exemplary interlocking reels 3012*a*, 3012*b*. As shown, reels 3012*a*, 3012*b* include female rings 3016*a*, 3016*b* and male rings 3032*a*, 3032*b*, respectfully. Female rings 3016*a*, 3016*b* each includes a series of equally spaced holes 3018*a*, 3018*b*, respectfully, spaced equidistant inside the outer cylindrical surface of the ring that are configured to receive a series of equally spaced protrusions spaced equidistance inside the outer cylindrical surface of a corresponding male ring of an interlocking reel. For example, holes 3018*b* of female ring 3016*b* of reel 3012*b* are configured to receive protrusions 3020*a* of male ring 3032*a* of reel 3012*a* at location A and to thereby interlock the two reels. Holes 3018*a* of reel 3012*a* may similarly receive protrusions of another reel to interlock to it and protrusions 3020*b* of reel 3012*a* may similarly be received in the holes of another reel to interlock to it. Any number of reels may be interlocked, limited only by the space between end cap 3004 and end cap 3008. The interlocking reels at the ends of an assembly of interlocking reels may be coupled to end caps 3004, 3008 similarly to how the interlocking reels are locked together. For example, protrusions 3020 on the reel 3012 closest to end cap 3004 may be received in holes 3076 of end cap 3004. End cap 3008 may have protrusions like protrusions 3020 on its inner surface configured to receive at least some of the holes 3018 of the interlocking reel 3012 closest to end cap 3008. Curved plates 3024 (such as curved plates 3024*a*, 3024*b* shown in FIGS. 3E-3G) may together act as a surface for supporting and winding a line, such as line 1120 described with reference to FIG. 1, coupled to a probe, such as probe 1116, also described with reference to FIG. 1, around each reel 3012, as the drum 3000, including each reel 3012, is simultaneously rotated around its central longitudinal axis by a motor, such as motor 1128 described with reference to FIG. 1, coupled to flange gear 3036.

Figure 4:
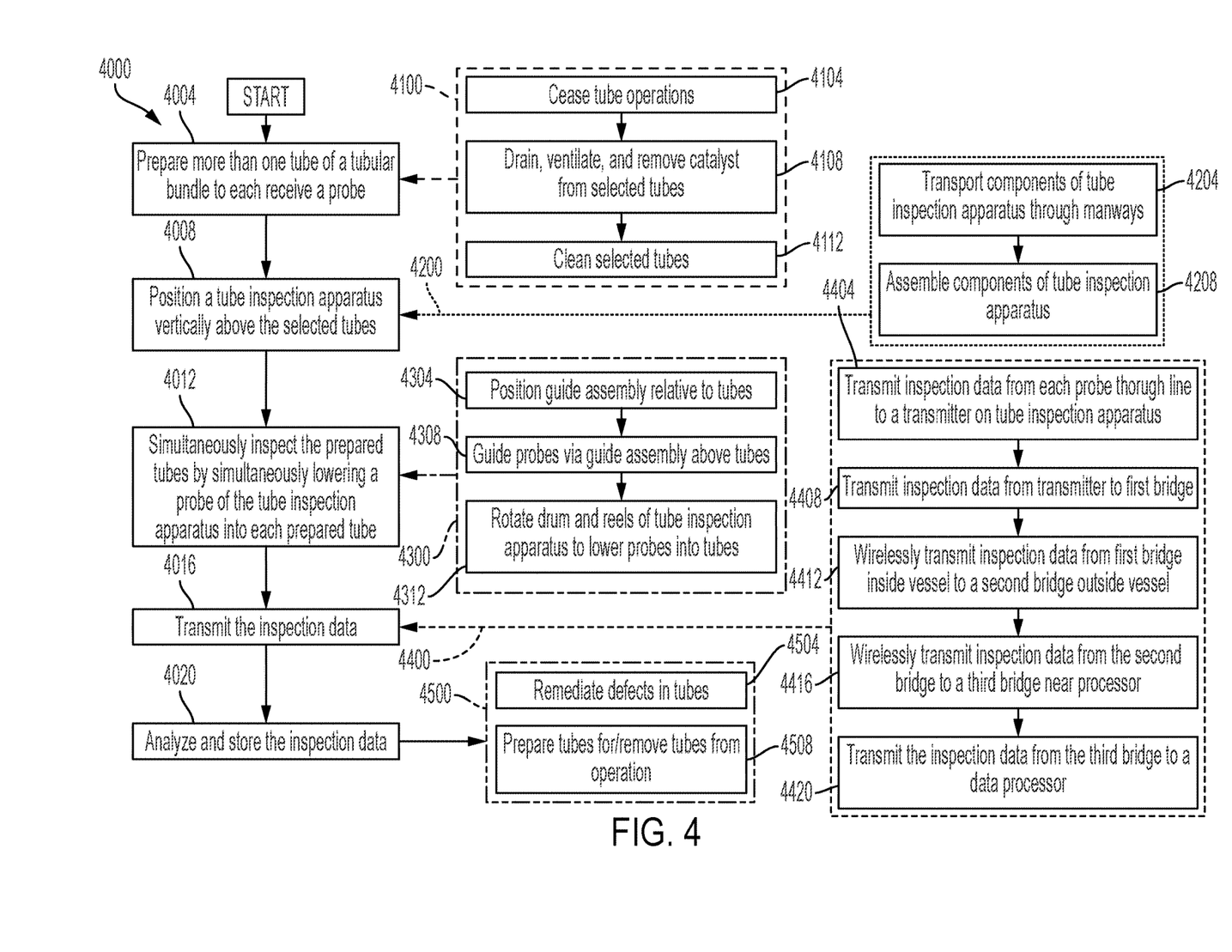
FIG. 4 depicts flow charts illustrating methods of inspecting tubes using a tube inspection apparatus, according to some of the embodiments of the present systems, apparatuses, and methods.

Turning now to FIG. 4, a flow chart of a method 4000 of inspecting tubes of a vessel according to some embodiments of the present invention is shown. In step 4004, more than one tube of a tubular bundle, such as the tubes of tubular sheets 1012*a*, 1012*b*, are prepared to each receive a probe for inspection. Such preparation may include, for example, the steps set out in preparation method 4100. In step 4104 of preparation method 4100, tube operations in the selected tubes are ceased (e.g., reactions are stopped). In step 4108, the selected tubes are drained (e.g., of petrochemicals), the vessel is ventilated, and any catalyst in the selected tubes is removed. (If the vessel is a reactor or exchanger, the tube may contain catalyst. For example, various petroleum products may flow through one or more of the selected tubes during operation where the product is refined through reaction with the catalyst.) Any other component of the tubes that would interfere with movement of a probe within the tubes can also be removed. Access to the selected tubes may be received through a top chamber, such chamber 1016*a* via manway 1020*a*, through a bottom chamber, such as chamber 1016*b* via manway 1020*b*, or otherwise, depending on the configuration of the vessel. Finally, at step 4112, the selected tubes are cleaned (e.g., of petrochemicals, so as to not interfere with any ET or damage or dirty any probe).

After preparing the selected tubes for inspection at step 4004, one or more tube inspection apparatuses, such as tube inspection apparatuses 1100*a*, 1100*b*, can be positioned vertically above the selected tubes. In order to position the one or more tube inspection apparatuses vertically above the selected tubes, such tube inspection apparatus may need to pass through a manway, such as manway 1020*a*. If a tube inspection apparatus is too large to pass through the manway and the tube inspection apparatus is configured with a base such as base 2100, positioning step 4008 may include the steps of positioning method 4200. For example, at step 4204, the tube inspection apparatus may be disassembled into components (such as a drum, a frame, a bottom (or portions of a bottom) assembly, a guide (or portions of a guide) assembly, and probes) and the components of such tube inspection apparatus may be individually transported through the manway into a chamber of the vessel. Then, at step 4208, the components of the tube inspection apparatus may be reassembled within the chamber of the vessel and the assembled tube inspection apparatus positioned vertically above the selected tubes.

After positioning the tube inspection apparatus vertically above the prepared tubes, the tube inspection apparatus may be operated, e.g., individually controlled, to simultaneously inspect the prepared tubes by simultaneously lowering each probe of the tube inspection apparatus into a different prepared tube and performing an ET via the probes. In order to facilitate such inspection operation, the steps of inspection method 4300 may be performed. For example, a guide assembly of the tube inspection apparatus, such as guide assembly 2300, may be positioned to guide the probes into the prepared tubes by, for example, adjusting the spacing of guide rings, such as guide rings 2308, and adjusting the lateral distance of the probes from the base of the tube inspection apparatus by adjusting the lateral distance of a lower guide bar of the tube inspection apparatus, such as lower guide bar 2312. Once properly positioned, the probes of the tube inspection apparatus may be guided by the guide assembly simultaneously above the prepared tubes at step 4308. Finally, at step 4312, the drum, including its reels, of the tube inspection apparatus may be simultaneously rotated, for example by a shared electric motor coupled thereto, to thereby unwind the lines, such as lines 1120, coupled at one end to the reels, and thereby lower the probes coupled at the other end of the lines into the prepared tubes. While the plurality of probes are lowered through the plurality of tubes, they can perform an ET and, if so configured, collect video data of the tubes.

After and during step 4012, the data obtained by the inspection, e.g., the ET and/or video data, may be transmitted to a processor at step 4016. By using the steps, or similar steps, as those set out in transmission method 4400, the processor (and analyst) may be remotely located relative to the vessel and prepared tubes and the analyst won't be required to physically go to the vessel or send someone else to go to the vessel to obtain the inspection data. For example, at step 4404, the data from each probe may be transmitted through line coupled to the probe to a tester on the tube inspection apparatus (e.g., an inspection reel), such as tester 1204, where it may be stored in a testing box and/or DVR. At step 4408, the data may be transmitted from the tube inspection apparatus by a wired or wireless connection to a laptop, such as laptop 1216, or directly to a first bridge located within the vessel, such as bridge 1212*a*. An operator, such as data manager, can monitor the data by operating the laptop if the data is transmitted to the laptop either before being transmitted to the first bridge or in addition to be transmitted directly to the bridge. Alternatively or additionally, the data can be transmitted through a wired or wireless connection from the laptop to the first bridge. Next, at step 4412, the data can be transmitted through a wireless connection from the first bridge to a second bridge positioned outside but relatively near the vessel, such as bridge 1212*b*. Next, at step 4416, the data can be transmitted and/or directed through a wireless connection from the second bridge to a third bridge, such as bridge 1232, positioned relatively near the processor. The processor may be located in a building, a trailer, or another location and may be 1000 feet or more from the vessel. Next, at step 4420, the data can be transmitted through a wired or wireless connection to the data processor, such as processor 1240.

After transmitting the data to a processor, such as processor 1240, the data can be stored in the processor or another location and analyzed by an operator, such as an analyst. For example, the data can be parsed and, if needed, reordered as it is stored to assign the probe data the appropriate tube numbering before being analyzed by the analyst. Multiple analysts can work in collaboration if desired. The analyst(s) can then prepare a report based on the analyzed data. If the analyst(s) determines there are defects in any of the selected tubes, then additional steps of method 4500 may be performed and/or recommended in the report. For example, at step 4504, the defects in the tubes may be remediated by repairs. At step 4508, such tubes may be prepared for operation if repairs are feasible and/or desirable or may simply be removed from operation. As part of the preparation of such tubes for operation, the removed components, such as any catalyst, may be repositioned therein. As part of the removal of such tubes from operation, both ends of such tubes may be plugged to prevent product from entering such tubes. Additionally, such analysis of the defects may be stored and/or used with data from subsequent tube inspections or other data to better predict when tubes will fail and how long tubes will last before failing or having a substantial risk of failure from a given operation.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A tube inspection apparatus, comprising:
   a base having a bottom assembly;
   a cylindrical drum rotatably coupled to the base, the drum having two reels removably coupled together, each of the two reels configured to be coupled to its own respective probe by its own respective line, where one of the two reels is a first reel and the first reel's own respective probe is a first probe and the first reel's own respective line is a first line, the first probe configured to electromagnetically measure parameters of a first tube while in the first tube as the first probe travels through the first tube and transmit the measured parameters, where the cylindrical drum further comprises a first end cap and a second end cap that are held at a fixed distance from one another by a rod such that the first end cap and the second end cap maintain the fixed distance regardless of a number of reels positioned between them; and an electric motor coupled to the drum by a chain and a gear, the motor configured to rotate each of the reels at a same rate of speed such that the first probe may be simultaneously lowered into the first tube as the motor rotates the two reels.

2. The apparatus of claim 1, further comprising a guide assembly configured to be in contact with the first line and to guide movement of the first probe into the first tube.

3. The apparatus of claim 2, where the guide assembly is configured to adjust a position of the first line in two non-parallel directions.

4. The apparatus of claim 1, further comprising a control system configured to automatically stop a descent or ascent of the first probe in the first tube based on a signal received by the control system from a sensor on the first probe.

5. The apparatus of claim 1, where at least the first probe is removably coupled to its own respective reel.

6. The apparatus of claim 1, where the drum is configured to have between two and sixteen reels, including the two reels, that interlock to substantially form the drum.

7. A method for inspecting tubes comprising:
positioning a tube inspection apparatus vertically above the tubes, the tubes comprising a first tube and a second tube, the tube inspection apparatus having rotatable reels of a drum, the rotatable reels comprising a first reel and a second reel, where a first probe is coupled to the first reel by a first line and a second probe is coupled to the second reel by a second line;
removably coupling together the rotatable reels between a first and second end cap;
positioning the first end cap and the second end cap at a fixed distance from one another by a rod such that the first end cap and the second end cap maintain the fixed distance regardless of a number of reels positioned between them;
rotating the reels with an electric motor coupled to a gear of the drum by a chain;
simultaneously inspecting the first tube and the second tube by simultaneously lowering the first probe in the first tube and the second probe in the second tube while the first probe electromagnetically detects defects in the first tube and the second probe electromagnetically detects defects in the second tube; and
transmitting at least some information resulting from the electromagnetic detection in the first tube to a processor.

8. The method of claim 7, further comprising a step of preparing the first or second tube for the inspection by performing any of the following: ceasing operation of the first or second tube, draining the first or second tube of chemicals, ventilating a vessel that houses the first or second tube, removing a catalyst from the first or second tube, and cleaning the first or second tube.

9. The method of claim 7, where the step of positioning the tube inspection apparatus vertically above tubes further comprises assembling components of the tube inspection apparatus after transferring the components through a passageway of a vessel that houses the tubes.

10. The method of claim 7, where the step of simultaneously inspecting the first tube and the second tube further comprises:
positioning at least one portion of a guide assembly coupled to the tube inspection apparatus relative to the first tube and the second tube; and
guiding by the guide assembly the first probe into the first tube and the second probe into the second tube.

11. The method of claim 7, where the step of transmitting the at least some information further includes:
transmitting the at least some information from the first probe through the first line to a tester of the tube inspection apparatus; and
transmitting the at least some information through a bridge to the processor.

12. A system for inspecting tubes comprising:
a vessel having the tubes;
a tube inspection apparatus comprising:
a base coupled to a drum, the drum having two reels removably coupled together, each reel coupled to its own respective probe by its own respective line;
where the drum further comprises a first end cap and a second end cap that are held at a fixed distance from one another by a rod such that the first end cap and the second end cap maintain the fixed distance regardless of a number of reels positioned between them; and
the drum coupled to an electric motor by a chain and a gear, the electric motor configured to rotate each of the reels at a same rate of speed to simultaneously lower each respective probe into its own individual tube of the tubes, where each respective probe is configured to electromagnetically measure parameters of its own individual tube while in its own individual tube and communicate information resulting from the measured parameters to a tester; and
a data transmission assembly comprising:
the tester coupled to the tube inspection apparatus and configured to receive the information; and
a bridge configured to receive the information from the tester and transmit the information to a processor.

13. The system of claim 12, where the drum is configured to have between two and sixteen reels, including the two reels, that interlock to substantially form the drum.

* * * * *